Feb. 6, 1940.   E. A. MAHANNAH ET AL   2,189,589
APPARATUS FOR TESTING MATERIALS
Filed Jan. 19, 1937   2 Sheets-Sheet 1

INVENTORS
Everett A. Mahannah
Harold P. Bailey
BY Frank Tooley Jr.
ATTORNEY.

Feb. 6, 1940.  E. A. MAHANNAH ET AL  2,189,589
APPARATUS FOR TESTING MATERIALS
Filed Jan. 19, 1937  2 Sheets-Sheet 2
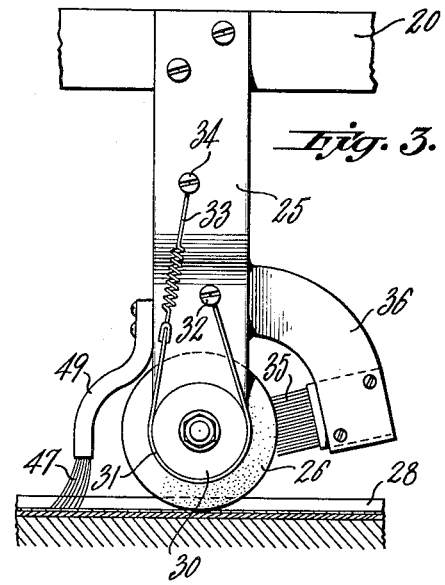
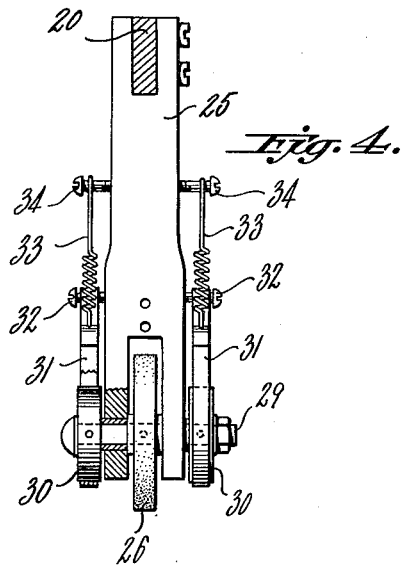
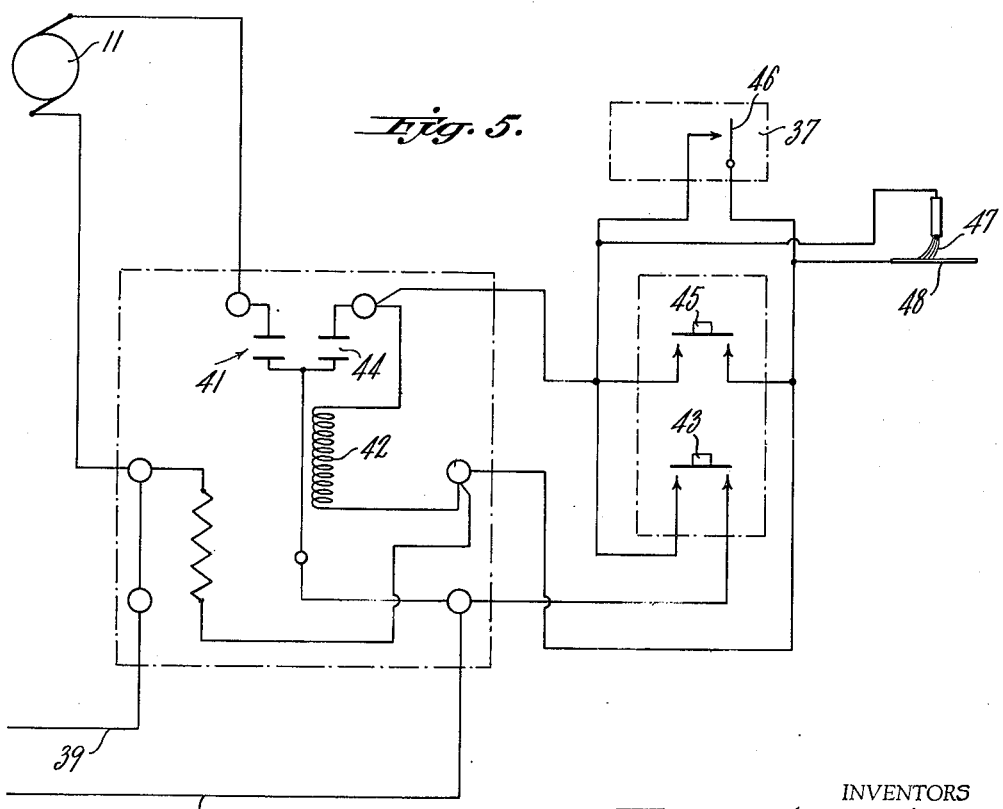
INVENTORS
Everett A. Mahannah
Harold P. Bailey
BY Frank Tookey Jr.
ATTORNEY.

Patented Feb. 6, 1940

2,189,589

UNITED STATES PATENT OFFICE 2,189,589

APPARATUS FOR TESTING MATERIALS

Everett A. Mahannah and Harold P. Bailey, Niagara Falls, N. Y., assignors to International Paper Company, New York, N. Y., a corporation of New York Application January 19, 1937, Serial No. 121,252

10 Claims. (Cl. 73—51)

This invention relates to a testing device, and more particularly to a testing device for determining the erasure qualities of paper and analogous sheet material.

In the manufacture of paper, it is necessary to meet the requirements of the user of the paper and, in a great many fields, as, for example, in the printing and office supply fields, the erasure qualities of the paper become extremely important. As a matter of every day occurrence, erasures must be made constantly. It is, therefore, necessary that the paper furnished be extremely resistant to the abrasive action of the erasures used and that the paper supplied from time to time possess substantially the same uniform resistance to such abrasive action. Unless the manufacturer of the paper has some means of accurately determining the erasing qualities of his paper, he will be unable to develop standard paper making furnishes and paper making methods in order to produce uniform grades of paper and to duplicate the desired qualities in such grades for repeat orders.

Accordingly it is an object of this invention to provide an erasure testing device so constructed as to determine with certainty the erasure qualities of each grade of paper produced so that standards may be developed which will enable the paper manufacturer more closely to control the paper making furnishes used in making up such grades and to control his methods of manufacture more accurately than has heretofore been considered possible.

Another object of this invention is to provide a device, as above described, which is sufficiently flexible in its operation to enable a manual control for routine test work; an automatic control to determine with exactness the number of strokes of the abrasive material required to wear a hole in the paper sample; and another control, also automatic in character, to determine the erasure quality of the sample tested at any given number of strokes.

Another object of this invention is to provide, in a device of the type above described, means to insure the same abrasive action on the sample being tested despite variations in the abrasive material due to natural wear and to provide means which will substantially prevent glossing of the abrasive material due to contact with the sample being tested.

A still further object of this invention is to provide, in a tester of the type above described, a relationship between the driving and operating parts of the mechanism, which will permit the abrasive material to move during each stroke in a plane parallel to the plane of the sample being tested so that throughout the length of each stroke the frictional contact between the abrasive material and the sample will be uniform and constant.

These and other objects of this invention will become more readily apparent from the following description and with reference to the accompanying drawings in which Fig. 1 shows a preferred form of my invention in side elevation;

Fig. 3 is a side elevation showing an important feature of my invention;

Fig. 4 is an end view of the portion shown in Fig. 3; and

Fig. 5 is a preferred wiring diagram for the invention.

Figure 1:
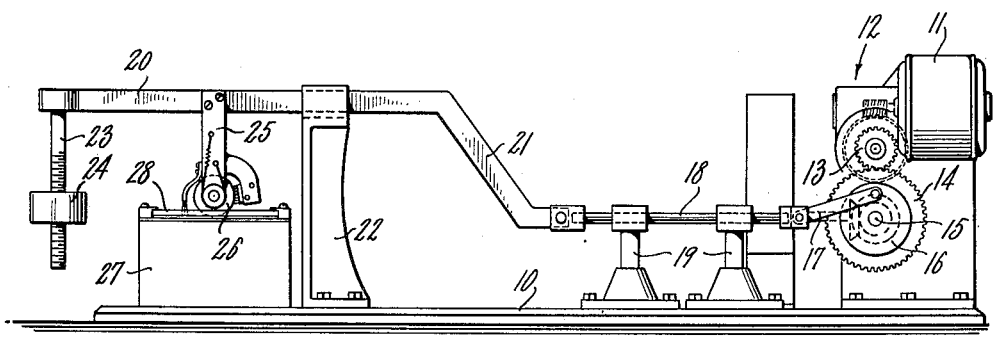
Figure 2:
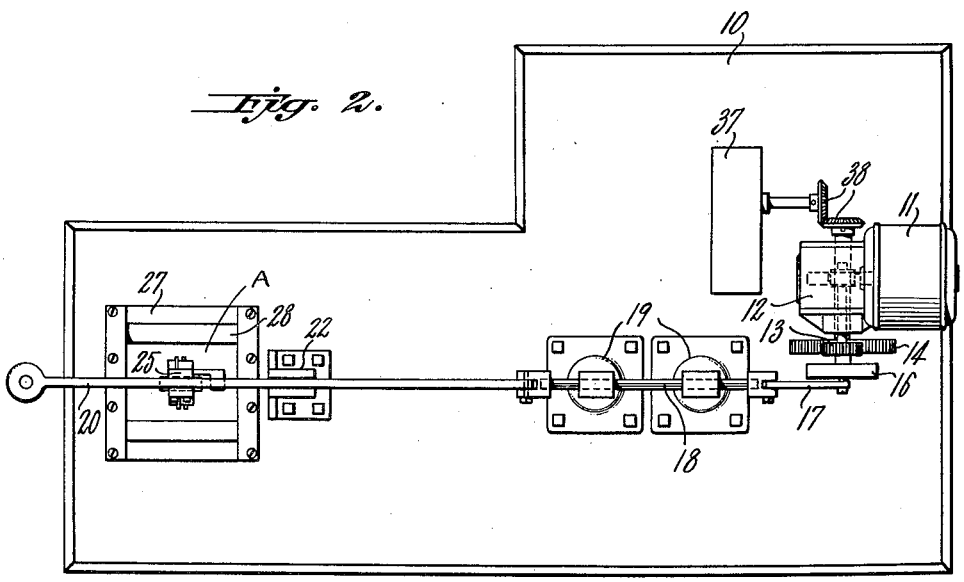
Fig. 2 is a plan view thereof.

Referring now to the drawings in which like numerals indicate like parts and more particularly to Fig. 1, there is shown a bed plate 10 upon which is mounted a motor 11 which drives reduction gearing 12, and a gear 13. The gear 13 meshes with a gear 14 upon a shaft 15 to which is fixed an eccentric disc 16. A crank arm 17 connected to disc 16 drives a sliding rod 18 guided in bearings mounted upon a pair of standards 19. Sliding rod 18 is pivotally connected to an eraser holder arm 20 having a section 21 designed to position the arm 20 above the sample holder for a purpose to be hereinafter more fully described. Arm 20 is guided by a standard 22 which prevents the eraser holder from wobbling from side to side. At the end of the eraser holder arm, there is a depending threaded member 23 which, in itself, is a weight and to which an additional weight or weights 24 may be secured. A bracket 25 fixed to the arm 20 carries the operating part of the erasing mechanism. It is apparent from an inspection of Fig. 1 that due to the shape of the holder arm 20, the operating face of the eraser 26 carried by bracket 25 will lie substantially in the same horizontal plane as the shaft 15, sliding rod 18 and the center of the weight 24, thereby causing the application of a constant and predetermined force to the eraser at all times during its operating stroke. The frictional contact between the eraser and paper sample will therefore be constant. The length of the stroke is determined by the eccentricity of the connection of crank arm 17 to disc 16. The eraser operates upon a sample A mounted upon a table or sample holder 27 and held in place by a clamp 28.

Referring to Figs. 3 and 4, it will be noted that the eraser 26 is fixedly secured to a shaft 29 carried in the bifurcated end of bracket 25. Also secured to shaft 29 is a pair of brake-drums 30 around which are positioned brake-bands 31. One end of each brake-band is connected directly to a pin 32 and the opposite end is connected to a spring 33 whose free end is secured to a pin 34. Each movement of the eraser holder 20 toward the right of Fig. 1 causes the brake-band to tighten upon the brake-drum, thus holding the eraser against rotation and causing the same to abrade the surface of the sample A. Each movement of the eraser holder 20 in the direction toward the left of Fig. 1 causes the brake-band to stretch the spring 33, thus permitting the eraser to rotate to present a new surface to the sample and to cause brush 35, bearing against its surface, carried by an arm 36 secured to bracket 25, to remove crumbs which may adhere to the surface of the eraser. By this construction, "glossing" of the abrasive material is prevented since at each reciprocation of the holder 20 a new surface is presented for contact with the said paper. The erasing qualities of the paper are determined by counting the number of strokes required to produce a given result on the sample, the counting being accomplished by a conventional revolution counter 37 driven by shaft 15 through gearing 38.

Means such as a blower (not shown) may be provided to direct a flow of air on the sample paper being tested to keep the surface thereof clean and uniform during the test by removing small particles of paper, fibres and erasure material which otherwise would tend to form small balls or rollers on which the erasure would ride. Preferably the blower is connected to motor 11 so that it will operate only when the motor is running.

In order to provide a testing device of the character described which will be sufficiently flexible in its operation to be used for mill testing purposes, as well as for the development of standards in determining the erasure qualities of various grades of paper, there has been provided a manual control in addition to two types of automatic control.

In Fig. 5 there is illustrated a preferred electrical hook-up which has been satisfactory to accomplish the objectives for which the tester was devised. It will be noted that provision is made for starting the driving motor by means of a conventional push-button which energizes the solenoid in order to close the motor circuit. The solenoid is of the self-locking type and holds the motor circuit closed even after release of the conventional push-button. When it is desired to operate the tester manually, use is made of a second push-button which, when pushed, will short circuit and deenergize the solenoid, opening the motor circuit and stopping the motor. A preferred embodiment of this control arrangement comprises main lead-in connections 39 and 40 which feed the motor 11 through contacts 41. These contacts are closed by means of solenoid 42 which is energized from the main lead-in wires through a conventional push-button switch 43. The solenoid 42, when energized, closes not only the contacts 41 to start the motor, but also closes contacts 44 which maintain the solenoid connected across the lead-in wires 39 and 40. The manual stopping switch 45 is connected in parallel with an automatic stopping switch 46 operated by the stroke counter and is also in parallel with the brush 47 adapted to make contact with a plate 48 through a perforation in the paper. When any one of these switches is closed, the solenoid 42 is short circuited and deenergized, releasing both the motor contacts 41 and the locking contact 44. The brush 47 is secured in any suitable holder 69 mounted on bracket 25 so as to be in line with the eraser 26.

Assuming that, in making a test, it is desired merely to make a rough check of the erasure quality of the sample to be tested, the sample will be placed in the sample holder 28 and the motor 11 started by pushing button 43. By visual inspection the operator can tell with reasonable exactness the rapidity with which the eraser wears the surface of the paper and when satisfied as to the approximate erasure quality of the sample may stop the motor by pushing button 45. This type of test, although not entirely dependable in determining the erasure quality of paper, will serve in many purposes to aid the mill operator in determining whether or not the given grade of paper being produced is approximately up to the standards required for that grade.

However, this type of test is only used as a routine check. Since a mill making fine grade papers is usually equipped with a testing laboratory, an automatic test can be used. Assuming that standards have been set up which show that for a given number of strokes the abrasive action on the paper should bear a certain ratio to that number of strokes, the automatic feature of the tester may be used. Thus the revolution counter switch will be set to stop the motor after the designated number of strokes and the operator, after having set the counter, will start the motor by pushing button 43. After the predetermined number of strokes have been given to the paper the switch 46 will automatically close, deenergizing solenoid 42 and releasing both motor contact 41 and locking contact 44. In this way, the operator may leave the instrument during the period of test without danger and upon completion of the test will be able to compare the abrasive action of the eraser on the paper with a standard sample in order to determine whether or not the sample tested meets the specifications required.

In order to assist in the development of standards for the different grades of paper which are used in those fields demanding high erasure qualities, and moreover in order to provide an even more accurate measurement of the erasure qualities of the paper to be tested, a third method of making the test may be employed. In this construction, the sample to be tested is placed in the holder provided for that purpose and the motor started as hereinbefore described. The plate upon which the sample to be tested is placed is made of some high conducting material and the brush 47 carried by holder 49 is likewise made of some high conducting material. As long as the paper sample has not been worn through by the abrasive action of the eraser, there will be no contact between brush 47 and plate 48, but as soon as the paper is perforated, contact will be made, thus stopping the motor as previously described. Since the brush is always in line with the eraser, the instant the paper is perforated by the eraser the motor will be stopped so that the number of strokes taken may be accurately determined by a reading of the indicator. In the development of standard erasing qualities of various grades of paper, this latter method will be most satisfactory since an absolute indication of the number of strokes required to wear through any given grade of paper may be determined and in the development of standard grades, it will be a comparatively simple matter to provide a chart, setting forth the number of strokes required by the instrument to wear through a standard grade of paper and the mill operator, by a comparison with such chart, may determine within what percentage the paper is above or below standard.

From the above description, it is apparent that there has been provided an improved mechanism for testing the erasure qualities of paper and that the mechanism is sufficiently flexible to meet various mill and development conditions. The invention, as will be appreciated by those skilled in the art of testing material, is susceptible of many alterations and mechanical details without departing from the spirit or scope of the invention as defined in the appended claims.

We claim:

1. A testing device of the class described comprising in combination, a holder for the material to be tested, an abrasive element rotatably mounted on a support for abrading the surface of the material to be tested, means to reciprocate said support, and means to render said abrasive element inoperative for one half of each reciprocation of said abrasive element.

2. A testing device of the class described comprising in combination, a holder for the material to be tested, an abrasive element rotatably mounted on a support for abrading the surface of the material to be tested, means to reciprocate said support, means to render said abrading element inoperative for one half of each reciprocation of said abrasive element, and means to regulate the pressure of the abrasive element on the material to be tested during its operative stroke.

3. A testing device of the class described comprising in combination, a holder for the material to be tested, an eraser rotatably mounted on a support for abrading the surface of the material to be tested, means to reciprocate said support, and means to prevent rotation of said eraser during its operating stroke.

4. A testing device of the class described comprising in combination, a holder for the material to be tested, an eraser rotatably mounted on a support for abrading the surface of the material to be tested, means to reciprocate said support, means to prevent rotation of said eraser during its operating stroke, and means to regulate the pressure of the eraser on the surface of said material during its operative stroke.

5. A testing device of the class described comprising in combination, a holder for the material to be tested, an eraser rotatably mounted on a support for abrading the surface of the material to be tested, means to reciprocate said support, means to prevent rotation of said eraser during its operating stroke, means to regulate the pressure of the eraser on the surface of said material during its operative stroke, and means to remove foreign particles from the surface of said eraser.

6. A testing device of the class described comprising in combination, a holder for the material to be tested, an eraser rotatably mounted on a support for abrading the surface of the material to be tested, means to reciprocate said support, means to prevent rotation of said eraser during its operating stroke, means to regulate the pressure of the eraser on the surface of the material during its operative stroke, the eraser, pressure regulating means and reciprocating means being so arranged as to lie in the same plane whereby to maintain a uniform frictional contact between the eraser and material being tested throughout the operating stroke of the eraser.

7. A testing device of the class described comprising in combination, a holder for the material to be tested, means to abrade the surface of said material, means to reciprocate said abrading means, means to render said abrading means inoperative for one half of each reciprocation, and automatic means for stopping the reciprocation of the abrading means when the latter has worn through the material being tested.

8. A testing device of the class described comprising in combination, a holder for the material to be tested, an eraser rotatably mounted on a support for abrading the surface of the material to be tested, means to reciprocate said support, means to prevent rotation of said eraser during its operating stroke, and automatic means for stopping the reciprocation of the abrading means when the latter has worn through the material being tested.

9. A testing device of the class described comprising in combination a holder for the material to be tested, means to abrade the surface of said material, means to reciprocate said abrading means, means to present a different portion of said abrading means to the material to be tested at each operative stroke of said abrading means, means to regulate the pressure of the abrading means on the material during its operative stroke, and automatic means for stopping the reciprocation of the abrading means after a predetermined number of strokes.

10. A testing device of the class described comprising in combination, a holder for the material to be tested, means to abrade the surface of said material, means to reciprocate said abrading means, means to present a different portion of said abrading means to the material to be tested between successive operating strokes, and means to regulate the pressure of the abrading means on the material during its operative stroke.

EVERETT A. MAHANNAH.
HAROLD P. BAILEY.